March 15, 1955

C. H. THAYER 2,704,228

GAS LIFT DISENGAGER

Filed Dec. 22, 1950

INVENTOR.
CLARENCE H. THAYER

BY *Busser and Harding*

ATTORNEYS

United States Patent Office 2,704,228
Patented Mar. 15, 1955

2,704,228

GAS LIFT DISENGAGER

Clarence H. Thayer, Wallingford, Pa., assignor to Sun Oil Company, Philadelphia, Pa., a corporation of New Jersey Application December 22, 1950, Serial No. 202,306

4 Claims. (Cl. 302—17)

This invention relates to the elevation of granular solids by means of lifting gas, and more particularly to the disengaging of granular solids from gas after such elevation.

Numerous industrial processes involve the continuous circulation of granular solids through a process system. Frequently in such processes, granular solids gravitate continuously through a reaction zone or zones and then are continuously elevated by means of a lifting gas from a level below the reaction zone or zones to a level thereabove. Upon reaching the higher level the granular material is disengaged, that is separated, from gas and returned to the reaction zone or zones for gravitation again therethrough. The present invention relates to a novel method and apparatus for effecting such disengaging with a minimum of attrition of granular solids.

So-called moving bed catalytic conversions of hydrocarbon oil are examples of processes wherein granular solids are elevated from a level below a conversion zone and other reaction zones such as a regeneration zone to a level above the reaction zones by means of a lifting gas, and wherein also it is highly undesirable that the granular solids should undergo excessive attrition.

The present invention provides method and apparatus whereby granular solids are elevated by lifting gas from an engager vessel through a lift conduit or a plurality of lift conduits to a disengager vessel in such fashion that the stream of gas and solids which continuously issues from the top of the lift conduit rises to a relatively short distance above the top of the conduit before reversing direction and falling into the part of the disengager below the top of the lift conduit. In this manner, the present invention provides a lower degree of attrition than can be obtained with prior art method and apparatus, and also makes it possible to use shorter disengagers to handle solids at a given rate than can be used with prior art method and apparatus.

The invention will now be described with reference to the attached drawing.

Figure 1:
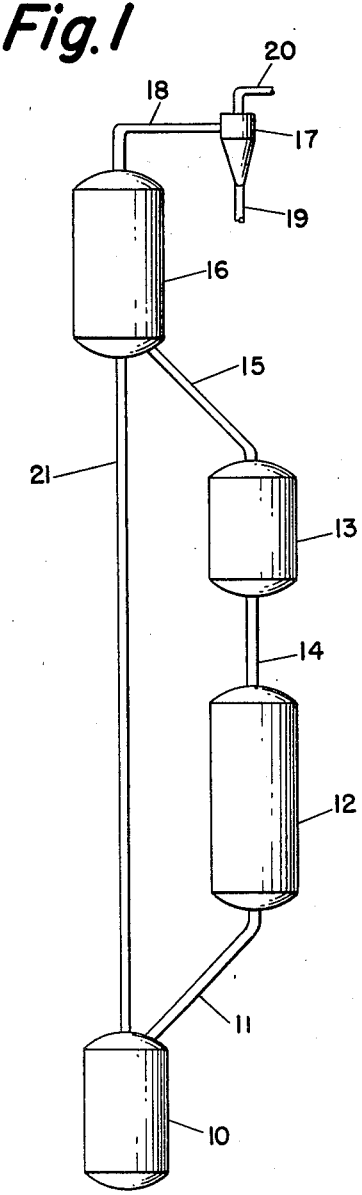
Figure 2:
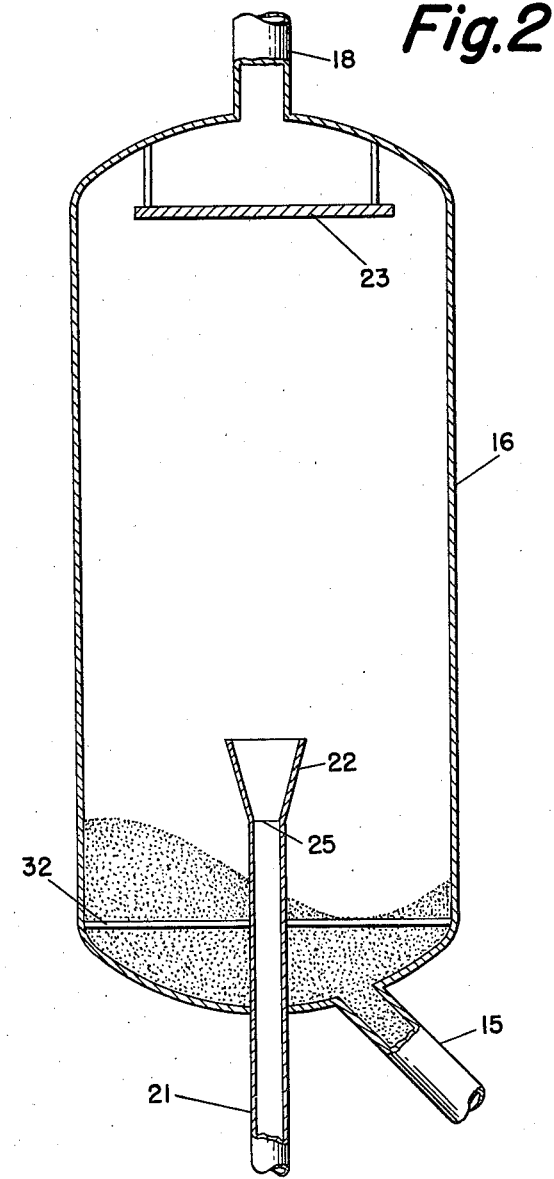

Figure 1 is a diagrammatic view of a process system through which granular solids are continuously circulated, gravitating through reaction zones and being elevated by means of a lifting gas from a level below the reaction zones to a disengaging vessel above the reaction zones. Figure 2 is a sectional elevational view showing the disengager and illustrating novel features of the invention.

Referring to Figure 1, 10 indicates the engager which receives catalyst or contact material by gravity through line 11 from a reaction zone such as a regenerator 12 positioned below an upper reaction zone 13 which is in communication with zone 12 through line 14 and which receives contact material by gravity continuously through line 15 from a disengager 16. Separating means such as a cyclone separator 17 are in communication with the disengager 16 through line 18 and fines are removed by the separator through line 19 while the lifting medium is removed from the separator 17 through line 20.

Conduit 21 is used to elevate granular material from engager 10 to disengager 16. The lower end of conduit 21 communicates with engager 10 and the upper end with disengager 16. Means are provided adjacent the lower end of conduit 21 to start the lifting of solids through conduit 21. These can be any suitable means, such as those disclosed in copending application of John F. McKinney, Serial No. 184,601, filed September 13, 1950.

Figure 1 does not show any details of the present invention and is provided merely to show the general arrangement of a system wherein catalyst or contact material is utilized in the form of a continuously moving mass.

Turning now to Figure 2, which shows details of the present invention: the outlet end 25 of lift conduit 21 extends through the lower end of disengager 16 and is positioned a short distance within the lower portion thereof. A spider 32 may be provided to maintain conduit 21 rigid. Secured to outlet end 25 of lift conduit 21 is a conduit section 22 having the shape of an inverted conical frustum. As shown, the vertical length of conduit section 22 is about three times the diameter of conduit 21, and the angle with the vertical of the sidewalls of conduit section 22 is about 15°. Conduit section 22 is concentric with, and can have the same shape of cross-section as, lift conduit 21. Any suitable cross-sectional shape can be used, e. g. circular, square, or other cross-section known for lift conduits.

The lift conduit 21 can be of any suitable known type: it can have substantially constant cross-section throughout its length, or it can gradually upwardly expand, e. g. at a rate such that its sides are inclined at an angle with the vertical within the approximate range 0.2–5 degrees.

Horizontal baffle plate 23 is positioned transversely within disengager 16 and provides, above outlet end 25 of conduit section 22, the upper boundary of a space in which gas and solids can rise without striking any transverse rigid obstruction, and in which solids can reverse direction through loss of momentum before reaching baffle plate 23. The top 24 of disengager 16 has an outlet 18 through which gas is removed from the disengager after passing around and above baffle plate 23.

In operation, lifting gas is introduced into lift conduit 21 by way of engager 10. Granular solids are introduced into lift conduit 21 by way of line 11 and engager 10. Lifting gas having solids suspended therein passes upwardly through conduit 21 as a confined stream. Lifting gas and solids are discharged from conduit 21 directly into and through conduit section 22 as a stream rising through the center of conduit section 22. By virtue of the dimensions of conduit section 22, the central rising stream of lifting gas and solids is surrounded by a narrow confined layer of gas which is, relative to the gas in the central rising stream substantially without upward motion. The rising stream is discharged from the conduit section 22 into the enlarged space provided by the disengager 16, and undergoes substantially unrestricted lateral expansion therein. Through loss of momentum, substantially all of the granular solids reverse direction before striking baffle plate 23 and fall around the central rising stream into the bottom of disengager 16.

It has been found that in operation, the stream of gas and solids which passes upwardly through conduit 21 and the space thereabove toward baffle plate 23 rises a shorter distance above the outlet end 25 of lift conduit 21 when conduit section 22 is present than when it is not present. Although I do not wish to be limited by any theory, it is believed that the reason for the relatively short height of rise is that, as the high velocity gas jet issues from the outlet end 25 of conduit 21, with conduit section 22 in place, the jet creates a vacuum adjacent the inner wall of conduit section 22, i. e. in the space between the inner wall and the central gas jet. This causes the atmosphere within the disengager 16 to tend to enter the conduit section 22 from above to fill the vacuum. This creates a condition of turbulence in conduit section 22 even greater than the turbulence which occurs at outlet end 25 of conduit 21 when conduit section 22 is not in place. The greater turbulence results in a large drop in gas velocity during passage of gas through conduit section 22.

It is to be understood that in place of an inverted frustoconical conduit section as shown in the drawing, other types of expanded conduit sections can be used, including expanding conduit sections having other than circular cross-section, provided that the top of the expanded conduit section is so spaced, above and laterally outwardly from the top of the lift conduit, that corresponding points on the top of the expanded conduit section and on the top of the lift conduit define straight lines inclined at an angle with the vertical within the approximate range 10° to 25°. Corresponding points, as contemplated here, are points of intersection, on the same side of the longitudinal axis of the lift conduit, of a vertical plane, which plane passes through that longitudinal axis, with the top of the expanded conduit section and with the top of the lift conduit. The above features of the expanded conduit section are necessary because, it is believed, satisfactorily high degrees of turbulence are otherwise not obtained.

Expanding conduit sections used according to the present invention preferably have vertical length not greater than about five times the major dimension (diameter in the case of lift conduit with circular cross-section) of the outlet end of the lift conduit to which they are secured; greater lengths can be used in some cases. The expanding conduit sections must, to be effective, have vertical length at least twice the major dimension of the outlet end of the lift conduit to which they are secured.

As an example of the manner in which decrease in heights of rise can be obtained according to the invention, the following results are presented of experiments wherein the operation of apparatus having the features of the present invention was compared with the operation of apparatus lacking the features of the present invention. The apparatus according to the present invention consisted of a disengager constructed similarly to disengager 16 in Figure 2. This apparatus had an inverted frustoconical conduit section secured to the top of the lift conduit, similarly to the conduit section 22 in the drawing. The dimensions of the lift conduit and conduit section were approximately as follows: lift conduit section, 8 inches; height of conduit section, 23 inches; diameter at top of conduit section, 20.5 inches; angle of conduit section sidewalls, 15 degrees. The other apparatus tested was the same except that there was no frustoconical conduit section secured to the top of the lift conduit. In both sets of apparatus there was a flat horizontal baffle plate more than 13 feet above the top of the expanding conduit, and above the baffle plate was a top gas drawoff from the chamber.

The two sets of apparatus as described above were operated as parts of gas lift systems operating under comparable process conditions such as velocity of the granular solids as discharged from the outlet end of the lift conduit. By plotting for each system of apparatus the height of rise of the solids above the outlet end of the lift conduit against the solids velocity as discharged from that outlet end, it was found that at equal velocities, apparatus according to the invention gives heights of rise averaging about 1.5 feet less than the heights of rise obtained with the other apparatus. For example, at a catalyst velocity of about 26.5 feet per second, the following approximate heights of rise were observed.

|  | Feet |
|---|---|
| Apparatus according to the invention | 11.0 |
| Apparatus without frustoconical section | 12.5 |

The above heights of rise were maximum heights of rise measured to the top of the rising stream of gas and solids and were determined by visual observation through windows in the apparatus.

These results demonstrate the surprising fact that pneumatically conveyed solids actually rise a shorter distance above the top of a lift conduit when they are discharged, rather than directly into a zone allowing substantially unrestricted lateral expansion of lifting gas, into a zone such as that provided by the present invention and thence finally into a zone allowing substantially unrestricted lateral expansion of gas.

The advantages of decreasing, according to the present invention, the height of rise of solids above the top of the lift conduit are advantages which are important in commercial processes. These advantages are described as follows:

By decreasing the height of rise, one decreases the average distance through which granular solids fall from the top of their rise until their fall is arrested, e. g. by hitting, below the top of the lift conduit, the top of a compact bed of solids gravitating through the lower portion of the disengager. By thus decreasing the distance of fall, one decreases the velocity of the solids at the moment their fall is arrested, and consequently decreases the degree of attrition suffered by the solids upon having their fall abruptly arrested. Since attrition is a phenomenon which must be avoided as much as possible if a process is to be economical, the present invention provides an important advantage by decreasing the degree of attrition.

By decreasing the height of rise, one also decreases the height required in the disengager, because less free space is required above the top of the lift conduit. In any disengager, it is important to have sufficient free space that the solids can reverse direction without having, while rising, struck any rigid solid obstruction, and the present invention requires less such free space since the solids do not rise as high.

In interpreting the example given previously, it should be noted that the effective decrease in height of rise is to be found by adding the height of the frustoconical conduit section to the 1.5 foot decrease in height of rise as measured from the outlet end of the lift conduit. Referring to Figure 2, the apparatus shown there provides, under the conditions of the example, a height of rise about 3.5 feet less than would be obtained in the absence of conduit section 22 and with outlet end 25 of lift conduit at the level of the top of conduit section 22 as shown. It is noted that if conduit section 22 were not present, outlet end 25 would have to be at that high a level in order to provide sufficient clearance between it and the top of the solids bed in the bottom of disengager 16.

The operating conditions which can be used in conjunction with apparatus and method according to the invention can generally be any suitable known conditions for carrying out a gas lift operation. However, it is preferred that the average upward velocity of solids at outlet end 25 of lift conduit 22 should not be less than about 15 feet per second; otherwise the stream of rising gas and solids decreases in velocity during passage through conduit section 22 to such a degree that there is a pronounced tendency for large quantities of solids to slip backward in the gas stream and cause uneven operation of the lift or possibly even stalling of the lift. Solids velocity at outlet end 25 can be determined approximately by using the following formula:

$$u_s = u_g - 9.9 \frac{D_s d_s}{d_g}$$

where $u_s$ is solids velocity in feet per second, $u_g$ is lifting gas velocity calculated by dividing the measured lifting gas rate in cubic feet per second by the average cross-sectional area of the lift conduit in square feet, $D_s$ is average particle diameter of the lifted solids in feet, and $d_s/d_g$ is the ratio of densities of the lifted solids and of the lifting gas.

In the example given previously, the expanded conduit section used had substantially the same shape of cross-section as the lift conduit to which it was secured. This is preferable according to the present invention, but not essential. It is to be understood that although expanded conduit sections according to the invention must be expanded around the complete periphery thereof, the degree of expansion need not be the same at all points on the periphery. Thus, an expanded conduit section having elliptical horizontal cross-section at the top thereof can for example be used with a cylindrical lift conduit, provided that both axes of the ellipse are longer than the diameter of the lift conduit, and provided that substantially all the angles with the vertical made by lines defined by corresponding points on the top of the lift conduit and on the top of the expanded section are within the range 10–25°. The expanded conduit can have any other suitable horizontal cross-section at the top thereof.

Apparatus and method according to the invention can be used to elevate granular solids generally, but they are particularly advantageously used with particle-form solid catalysts of the pellet or bead variety such as are commonly used in catalytic conversion of hydrocarbon oil. Such catalysts when freshly made are generally particles having major dimensions between, say, 1/16" and 3/4". Method and apparatus according to the invention are particularly effective to prevent excessive attrition of such catalysts.

I claim:
1. Apparatus for elevating granular solids by means of a lifting gas which comprises: a substantially vertical lift conduit; a conduit section secured to the upper end of said lift conduit and having cross section which is in all lateral directions expanded relative to that of said lift conduit, said conduit section being concentric with said lift conduit, the height of said conduit section being within the range from 2 to 5 times the internal major dimension of the upper end of said lift conduit, and the lateral expansion of said conduit section being such that an imaginary line, between a point at the top of said conduit section and the nearest point at the top of said lift conduit which lies in the same vertical plane as said point, is inclined at an angle with the vertical within the approximate range from 10° to 25°, said angle being greater than the angle with the vertical of the outer surface of the upwardly expanding, rising stream of lifting gas within said conduit section; a disengaging vessel communicating with the upper end of said conduit section and providing a space free of any transverse rigid obstruction, for upward travel of solids in said disengaging vessel and for downward travel therein after reversal of direction; and means for introducing granular solids and lifting gas into said lift conduit for travel upwardly therethrough and into said disengaging vessel.

2. Apparatus for elevating granular solids by means of a lifting gas which comprises: a substantially vertical, cylindrical lift conduit; secured to the upper end of said lift conduit, a frustoconical conduit section having upwardly increasing cross sectional area and concentric with said lift conduit, the height of said conduit section being within the range from 2 to 5 times the internal diameter of the upper end of said lift conduit, and the sidewall of said conduit section being inclined at an angle with the vertical of 10° to 25°, said angle being greater than the angle with the vertical of the outer surface of the upwardly expanding, rising stream of lifting gas within said conduit section; a disengaging vessel communicating with the upper end of said conduit section and providing a space free of any transverse rigid obstruction, for upward travel in said disengaging vessel and for downward travel therein after reversal of direction; and means for introducing granular solids and lifting gas into said lift conduit for travel upwardly therethrough and into said disengaging vessel.

3. Method for elevating granular solids by means of a lifting gas which comprises: passing lifting gas having solids suspended therein upwardly as a confined stream through a confined zone; discharging lifting gas and solids from said confined zone directly into a second zone having cross sectional area which is in all lateral directions expanded relative to that of said confined zone, said second zone being concentric with said confined zone and having height within the range from 2 to 5 times the major dimension of said confined stream; passing solids through said second zone as a central stream having relatively high velocity, and surrounded by a narrow layer of gas substantially free from solids and having relatively low velocity, the boundary of said second zone being laterally spaced farther from the longitudinal axis of said second zone than the outermost portion of the stream of lifting gas rising through said second zone after discharge from said confined zone; discharging gas and solids from said second zone upwardly into an expansion zone allowing substantially unrestricted lateral expansion of gas; expanding the gas laterally in said expansion zone; passing solids upwardly in substantially unobstructed movement in said expansion zone; passing solids downwardly in said expansion zone after reversal of direction; and removing gas and solids from said expansion zone.

4. Apparatus according to claim 2 wherein the section is inclined at an angle with the vertical of about 15°.

References Cited in the file of this patent
UNITED STATES PATENTS

| | | |
|---|---|---|
| 1,498,630 | Jensen | June 24, 1924 |
| 1,829,291 | Nagel | Oct. 27, 1931 |
| 1,904,990 | Vawter | Apr. 18, 1933 |
| 2,562,930 | Mapes | Aug. 7, 1951 |
| 2,607,635 | Kollgaard | Aug. 19, 1952 |